United States Patent
Stephens, Jr.

(10) Patent No.: US 8,881,275 B2
(45) Date of Patent: *Nov. 4, 2014

(54) VERIFYING WORK PERFORMED BY UNTRUSTED COMPUTING NODES

(71) Applicant: Empire Technology Development LLC, Wilmington, DE (US)

(72) Inventor: James H. Stephens, Jr., Austin, TX (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,413

(22) Filed: Nov. 19, 2013

(65) Prior Publication Data

US 2014/0082191 A1    Mar. 20, 2014

Related U.S. Application Data

(63) Continuation of application No. 13/054,055, filed as application No. PCT/US2010/042782 on Jul. 21, 2010, now Pat. No. 8,661,537.

(51) Int. Cl.
*G06F 11/00* (2006.01)
*H04L 29/08* (2006.01)
*H04L 12/26* (2006.01)

(52) U.S. Cl.
CPC ............... *H04L 43/00* (2013.01); *H04L 67/10* (2013.01)
USPC .................... 726/22; 726/23; 726/24; 726/25

(58) Field of Classification Search
CPC ............ H04L 63/1416; H04L 63/1408; H04L 63/145
USPC ..................................... 726/22–25
See application file for complete search history.

(56) References Cited

U.S. PATENT DOCUMENTS

| 5,046,094 A | 9/1991 | Kawamura et al. |
| 6,519,702 B1 * | 2/2003 | Williams ................ 726/23 |

(Continued)

FOREIGN PATENT DOCUMENTS

| JP | 03-073990 A | 3/1991 |
| JP | 08-249196 A | 9/1996 |

(Continued)

OTHER PUBLICATIONS

Jeffery Dean, et al "MapReduce: Simiplified Data Processing on Large Clusters" Available online [http://labs.google.com/papers/mapreduce.html] 2004.

(Continued)

*Primary Examiner* — Teshome Hailu
(74) *Attorney, Agent, or Firm* — Maschoff Brennan

(57) ABSTRACT

Techniques for verifying work performed by untrusted computing nodes are provided. A central computing system determines a first computation that is to be performed, at least in part, by a first untrusted computing node. The central computing system also determines a transformation function that is applied to the first computation to produce an equivalent second computation that is to be performed, at least in part, by a second untrusted computing node. The central computing system assigns the first computation to the first untrusted computing node and the second computation to the second untrusted computing node while keeping the transformation function secret. The central computing system receives a first result for the first computation and a second result for the second computation. The central computing system analyzes the first and second results to verify the work performed by the first and second untrusted computing nodes.

17 Claims, 6 Drawing Sheets

(56) References Cited

U.S. PATENT DOCUMENTS

| | | | |
|---|---|---|---|
| 7,353,531 B2 | 4/2008 | Brown et al. | |
| 8,331,632 B1* | 12/2012 | Mohanty et al. | 382/118 |
| 8,661,537 B2* | 2/2014 | Stephens, Jr. | 726/22 |
| 2001/0039624 A1* | 11/2001 | Kellum | 713/201 |
| 2003/0225822 A1 | 12/2003 | Olson et al. | |
| 2005/0166041 A1 | 7/2005 | Brown | |
| 2005/0289650 A1 | 12/2005 | Kalogridis | |
| 2007/0006224 A1 | 1/2007 | Stocker | |
| 2007/0094734 A1* | 4/2007 | Mangione-Smith et al. | 726/24 |
| 2007/0294769 A1* | 12/2007 | Bird | 726/24 |
| 2008/0271144 A1* | 10/2008 | Bleumer | 726/22 |
| 2009/0133123 A1* | 5/2009 | Radha et al. | 726/24 |
| 2009/0216910 A1 | 8/2009 | Duchesneau | |
| 2010/0017870 A1* | 1/2010 | Kargupta | 726/14 |

FOREIGN PATENT DOCUMENTS

| | | |
|---|---|---|
| JP | 2005-044204 A | 2/2005 |
| JP | 2006-031692 A | 2/2006 |
| JP | 2006-522968 A | 10/2006 |
| JP | 2008-003907 A | 1/2008 |

OTHER PUBLICATIONS

The Apache Software Fuondation "Welcome to Apache Hadoop!" Hadoop Available online [http://hadoop.apache.org/2013.

Hashcash.org "Hashcash" Available online [http://www.hashcash.org/] retrieved on Mar. 30, 2010.

Vijay Pande and Stanford University "Our goal: to understand protein folding, misfolding, and related diseases" Folding©Home Available online [http://folding.stanford.edu/] retrieved on Mar. 30, 2010.

Wikepedia "List of Distributed Computing Projects" Available online [http://en.wikipedia.org/wiki/List_of_distributed_computing_projects]. Jun. 2013.

Klaus Havelund, et al "Monitoring Java Programs with PathExplorer." Available online [http://ti.arc.nasa.gov/m/pub/archive/0264.pdf]. 2001.

Boaz Barak, et. al. "On the (Im)possibility of Obfuscating Programs." Available online [http://citeseerx.ist.psu.edu/viewdoc/download?doi=10.1.1.111.8717&rep=rep1&type=pdf]. 2001.

C. Linn, et. al. "Obfuscation of executable code to improve resistance to static disassembly." Available online [http://citeseerx.ist.psu.edu/viewdoc/download?doi=10.1.1.8.9799&rep=rep1&type=pdf ] . 2003.

Tal Garfinkel, et. al. "Terra: A virtual machine-based platform for trusted computing." Available online [http://citeseerx.ist.psu.edu/viewdoc/download?doi=10.1.1.3.1091&rep=rep1&type=pdf]. 2003.

Siani Pearson, "Trusted Computing Platforms, the Next Security Solution." Available online [http://www.hpl.hp.com/techreports/2002/HPL-2002-221.pdf]. 2002.

Joshua Schiffman, et al "Justifying Integrity Using a Virtual Machine Verifier" Available online [http://www.patrickmcdaniel.org/pubs/acsac09c.pdf] 2009.

Leroy Xavier, "Java Bytecode Verification: Algorithms and Formalizatins". Available online [http://pauillac.inria.fr/~xleroy/publi/bytecode-verification-JAR.pdf]. 2003.

International Search Report dated Nov. 23, 2010 in application No. PCT/US2010/042782.

* cited by examiner

VERIFYING WORK PERFORMED BY UNTRUSTED COMPUTING NODES

CROSS-REFERENCE TO RELATED APPLICATIONS

This application is a continuation of U.S. patent application Ser. No. 13/054,055, which is the U.S. national stage of PCT International Patent Application No. PCT/US2010/042782, filed Jul. 21, 2010. The foregoing applications are incorporated herein by reference.

BACKGROUND

Distributing large computations across a large number of computing nodes has become increasingly popular. Distributing such large computations allows for complex problems to be solved that might otherwise be beyond the processing resources of a single computing system or a small number of computing systems. Generally, a central computing system provides a portion of the large computation to each computing node. The computing nodes in turn perform the portions they have been assigned and return the results to the central computing system. The central computing system may then process the various results from the computing nodes to determine the overall solution to the large computation.

One common approach is to distribute portions of a large computation to volunteers taken from the general public. The volunteers allow their computers to act as computing nodes of the distributed system. Accordingly, a central computing system provides each of the volunteers' computing nodes a portion of the large computation to perform. This approach allows for the utilization of processing resources of the computing nodes when the nodes are not in use by the volunteers or when the volunteers are not utilizing the full processing resources of their computing nodes.

Although the use of volunteers from the public provides for low cost access to processing resources, there are several drawbacks. First, the computing nodes that are performing the portions of the large computation are untrusted from the perspective of the central computing system since they are volunteer nodes. Accordingly, a computing node could accidentally make a mistake as a result of introducing bugs in the program code of the problem to be solved, user error, misconfiguration of external data, or other similar circumstances. Alternatively, a computing node could attempt fraud by providing false solutions to the assigned computation or by stealing the results from another computing node and then providing those results as its own results.

Some systems provide security measures such as encryption and digital signatures in an attempt to prevent such fraud. However, such measures cannot detect certain kinds of error or sophisticated fraud. For example, an adverse party could interrupt a computation in process, change some values, and allow the computation to continue in such a way that conventional encryption and digital signatures could not detect.

SUMMARY

An illustrative embodiment disclosed herein relates to a method and computer program product for a central computing system to verify work performed by two or more untrusted computing nodes that are coupled to the central computing system. The central computing system determines a first computation that is to be performed, at least in part, by a first untrusted computing node. The central computing system also determines a transformation function that is applied to the first computation to produce an equivalent second computation that is to be performed, at least in part, by a second untrusted computing node. The central computing system assigns the first computation to be performed by the first untrusted computing node and the second computation to be performed by the second untrusted computing node while keeping the transformation function secret. The central computing system receives a first result for the first computation from the first untrusted computing node and a second result for the second computation from the second untrusted computing node. The central computing system analyzes the first and second results to verify the work performed by the first and second untrusted computing nodes.

An illustrative embodiment disclosed herein relates to a computing system. The computing system includes a processor, a database, computation generation module, transformation function module, a receive module, and an analysis module. The computation generation module generates a first computation to be performed by a first untrusted computing node. The transformation function module generates or obtains a transformation function that is applied to the first computation to produce an equivalent second computation. The second computation is to be performed by a second untrusted computing node. The assignment node assigns the first computation to be performed by the first untrusted computing node and assigns the second computation to be performed by the second untrusted computing node while keeping the transformation function secret. The receive module receives a first result for the first computation from the first untrusted computing node and a second result for the second computation from the second untrusted computing node. The analysis module analyzes the first and second results to verify the work performed by the first and second untrusted computing nodes.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
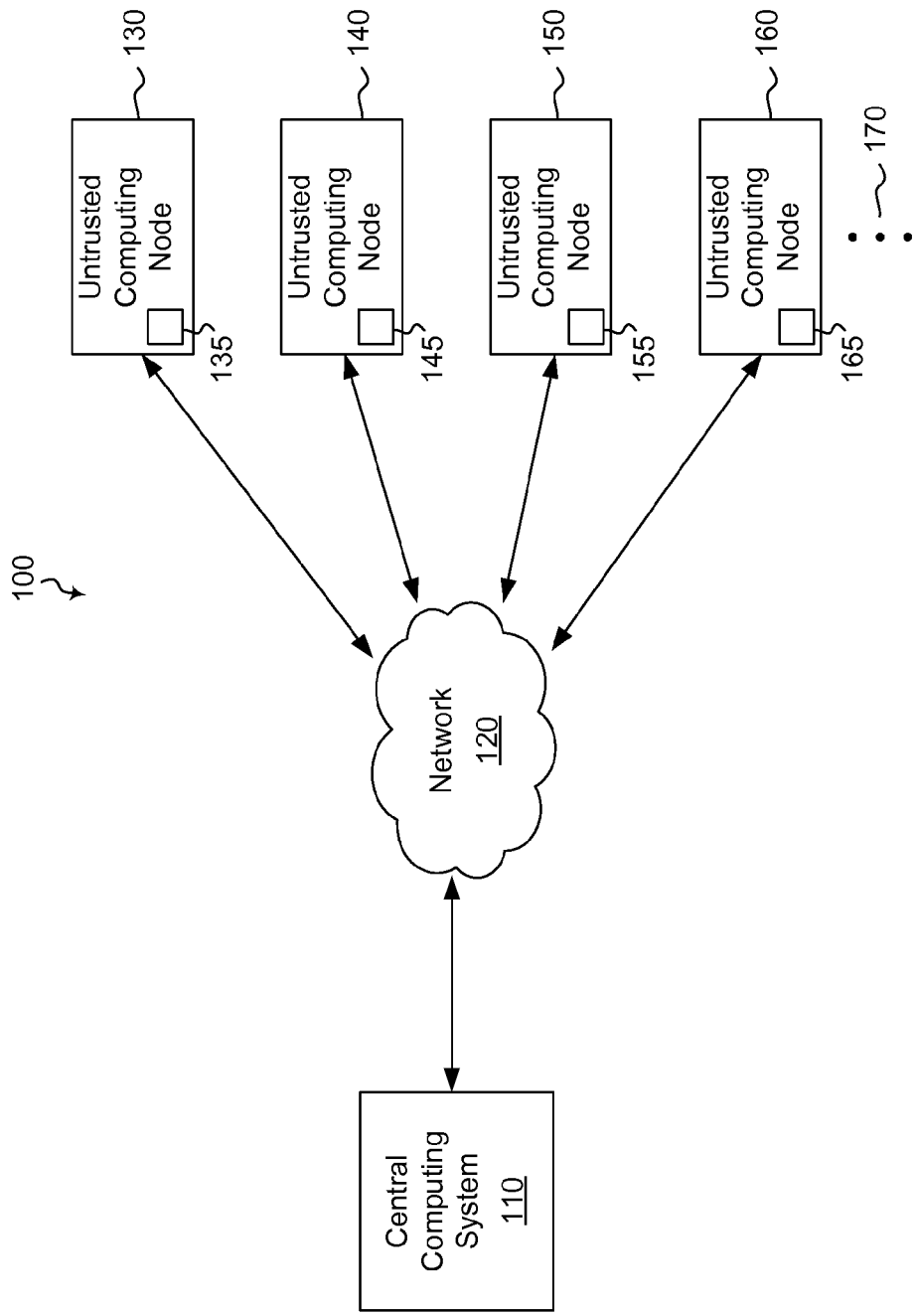
FIG. 1 is a schematic of an illustrative embodiment of a distributed computing system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to a distributed computing system. The distributed computing system includes two or more untrusted computing nodes that are operably coupled to a central computing system. The central computing system utilizes the processing resources of the two or more untrusted computing nodes to help perform large, complex computations that generally require a large amount of processing resources.

The two or more untrusted computing nodes may be any type of computing system that has processing resources that can perform at least a portion of a computation. Examples include, but at not limited to, desktop computers, laptop computers, mobile phones, and PDAs. The two or more untrusted computing nodes are untrusted from the perspective of the central computing system because the central computing system does not have direct control over the performance of the computing nodes.

Accordingly, the embodiments disclosed herein provide a mechanism for the central computing system to verify the work performed by the two or more untrusted computing nodes. The embodiments disclosed herein defend against untrusted computing nodes who are fakers or freeloaders. A faker is a node that pretends to do the assigned work when it really does not, and a freeloader attempts to copy work performed previously by itself or by another node. A vandal is a kind of faker who attempts to inject bad results into the complete computation. Thus, fakers and freeloaders may provide fraudulent, invalid information to the central computing system.

In addition, the embodiments disclosed herein defend against collusion by the two or more untrusted computing nodes. As will be explained in more detail, by providing different, but equivalent computations to be performed by the untrusted computing nodes, the ability of two nodes to work together to provide fraudulent, invalid results is diminished.

According to an embodiment, the central computing system determines a first computation that the untrusted computing nodes are to help perform. Generally, the first computation is performed by a first untrusted computing node. The first computation may be divided into computation components, with each subset being performed by an untrusted computing node.

To protect against collusion, freeloading, or faking, the central computing system also determines a transformation function to apply to the first computation to produce an equivalent second computation. A transformation function is any function that makes the second computation equivalent to the first computation. Thus, an equivalent computation is one that, when the transformation function is removed, is substantially the same as the first computation. More detail along with examples of transformation functions will provided hereinbelow. Generally, the equivalent second computation is performed by a second untrusted computing node. The transformation function may be selected from a transformation space that includes multiple transformation function components.

The central computing system may then assign the first computation to the first untrusted computing node and the second computation to the second untrusted computing system so that both computations may be performed. To guard against fraud or collusion, the first and second untrusted computing nodes may be randomly selected and assigned. In addition, the transformation function used to produce the equivalent second computation is kept secret from the first and second untrusted computing nodes as an additional safeguard.

Once the computations have been performed by the untrusted computing nodes, a first result for the first computation may be received from the first untrusted computing node. A second result for the second computation may be also received from the second untrusted computing node.

The first and second results may be analyzed to verify the work performed by the first and second untrusted computing nodes. That is, the analysis of the results helps to determine if one or both of the nodes is a freeloader or a faker or if the two nodes colluded to provide fraudulent invalid results. The analysis may remove the transformation function from the second result and then compare the first and second results. It will be appreciated that removing a transformation from the second result is typically performed by applying an inverse of the transformation function to the second result. Since this application of the inverse of the transformation to the second result makes the two results substantially the same as will be described in more detail to follow, the results are generally the same if the results are valid and are generally different if one or both of the results are invalid. As further safeguards against fraud, the historical trustworthiness of the untrusted computing nodes may be analyzed by consulting a database of historical data. Further, one or more probability functions may be applied to the results to determine if the probability that the results are valid.

Several illustrative embodiments of respective aspects of the present disclosure are given below by way of example with reference to the accompanying Figures. FIG. 1 is a schematic of an illustrative embodiment of a distributed computing system 100 including a central computing system 110 and multiple untrusted computing nodes 130, 140, 150, and 160. FIG. 1 also illustrates that any additional number of untrusted computing nodes 170 (shown by ellipses) may be included in the distributed computing system 100. One skilled in the art will appreciate that there may be a different number of untrusted computing nodes than that depicted in FIG. 1. In many embodiments, there may be thousands or even millions of untrusted computing nodes.

The central computing system 110 may be coupled to the untrusted computing nodes 130, 140, 150, 160, 170 by a network 120. As shown in FIG. 1, the central computing system 110 and the untrusted computing nodes 130, 140, 150, 160, 170 may communicate with each other bi-directionally over the network 120. The network 120 may be any network that is compatible with the central computing system 110 or the untrusted computing nodes 130, 140, 150, 160, 170 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, or the like or any combination thereof.

In one illustrative embodiment, the central computing system 110 generates a large, typically complex computation that is to be at least partially performed by the untrusted computing nodes 130, 140, 150, 160, 170. As will be described in more detail to follow, the central computing system 110 may generate a first computation and then provide a portion of the first computation over the network 120 for some of the untrusted computing nodes 130, 140, 150, 160, 170 to perform. The central computing system 110 may also generate an equivalent second computation based on a secret transformation function for some of the untrusted computing nodes 130, 140, 150, 160, 170 to perform.

The untrusted computing nodes 130, 140, 150, and 160 include processing resources 135, 145, 155, and 165, respectively. The processing resources 135, 145, 155, and 165 represent a processor and any other computer hardware and/or software that enable the computing nodes 130, 140, 150, and 160 to perform the first or second computations or a portion of the computations. It is noted that any of the untrusted computing nodes 170 also include a processor and other processing resources to perform the first or second computations.

Figure 2:
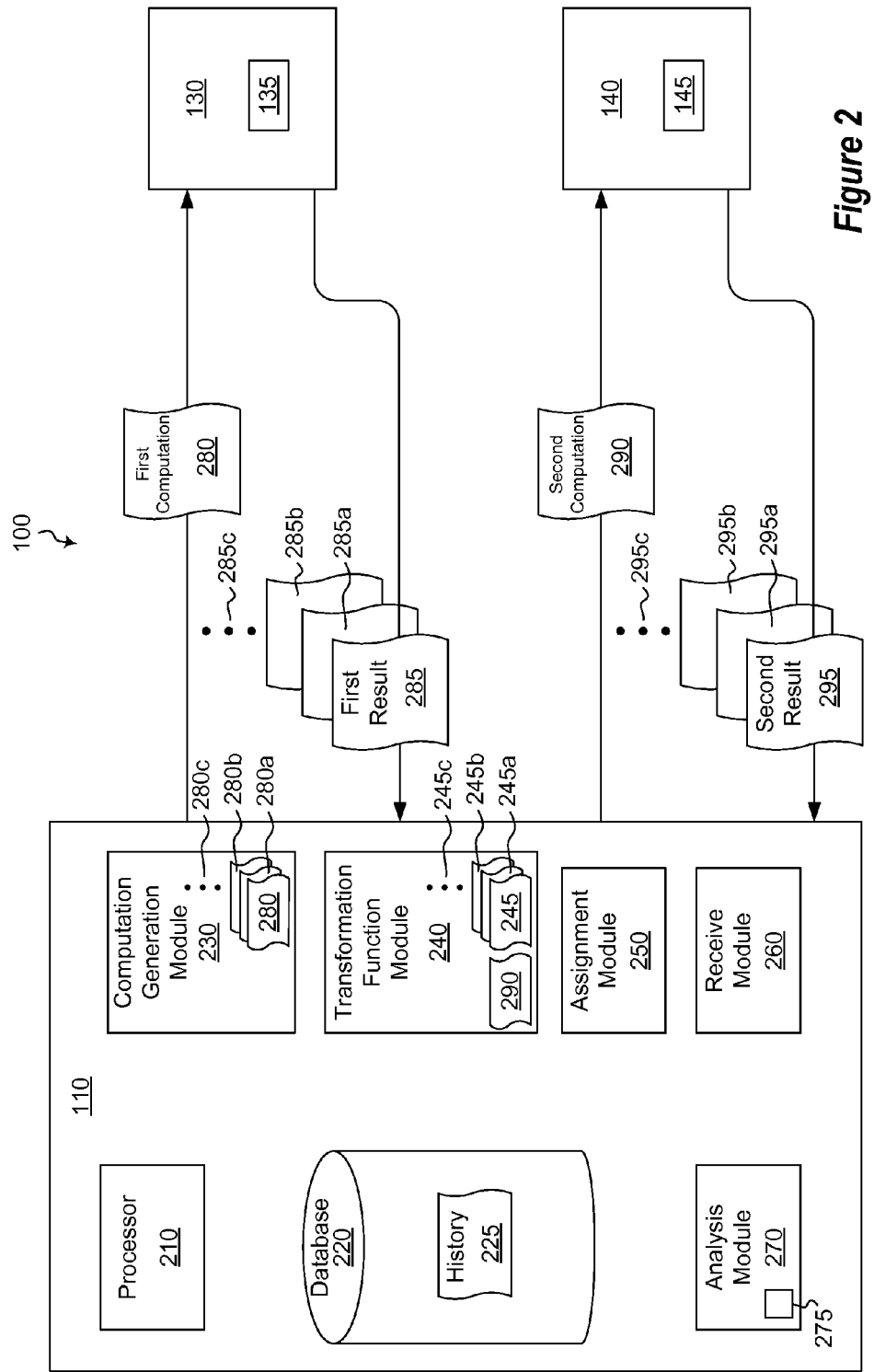
FIG. 2 is an illustrative embodiment a central computing system of the distributed computing system of FIG. 1.

FIG. 2 illustrates an illustrative embodiment of the central computing system 110 as well as a more detailed view of the distributed computing system 100. In FIG. 2, the network 120 has been omitted so that the additional features of this figure may be seen more clearly. As shown, the central computing system 110 includes various operational modules and databases that will be explained in more detail. Although not shown as being coupled, so as to not distract from the embodiments disclosed herein, it will be understood that the various operational modules and databases of the central computing system 110 may be coupled to each other by any reasonable means such as a computer bus, other wiring, or wireless connection as circumstances warrant.

As shown, the central computing system 110 includes a processor 210. The processor 210 may be any reasonable processor and in operation allows the central computing system 110 to perform various operations. In some embodiments, the processor 210 may be accessed by the various operational modules of the central computing system 110 to provide the modules processing resources. In other embodiments, the operational modules may have access to an alternative processor.

The central computing system 110 also includes a database 220. The database 220 may be any type of reasonable non-volatile or volatile memory. In one illustrative embodiment, the database 220 may include a history 225. The history 225 may include past results provided to the central computing system 110 by the untrusted computing nodes 130, 140, 150, 160, 170. The history 125 may be used by the central computing system 110 to determine the trustworthiness of the untrusted computing nodes 130, 140, 150, 160, 170 as will be explained in more detail to follow. Although the database 220 is shown as being included within the central computing system 110, in some embodiments the database 220 may be external to the central computing system 110 while being accessible to the central computing system 110.

A computation generation module 230 is also included in the central computing system 110. The computation generation module 230 may generate a first computation 280 that is to be performed by one or more untrusted computing nodes, such as one or more of the untrusted computing nodes 130, 140, 150, 160, 170. The first computation 280 may be any computation that the central computing system 110 desires the untrusted computing nodes 130, 140, 150, 160, 170 to help perform. In some illustrative embodiments, the first computation 280 may be a single problem that can be solved by one or a small number of the untrusted computing nodes 130, 140, 150, 160, 170. However, the first computation 280 is generally a large, complex problem that is broken into several parts and distributed to a large number of the untrusted computing nodes 130, 140, 150, 160, 170 for computation. For example, the first computation 280 may be divided into first computation components 280a, 280b, and potentially any number of additional first computation components 280c as illustrated by ellipses in FIG. 2.

The central computing system 110 includes a transformation function module 240. In one embodiment, the transformation function module 240 may generate a transformation function 245. The transformation function 245 is generally related to the first computation 280 in such a way that when the transformation function 245 is applied to the first computation 280, a second computation 290 that is equivalent to the first computation 280 is produced. Accordingly, the transformation function 245 is generally selected based on the type of problem that is associated with the first computation 280. It will be appreciated that the transformation function 245 comprises the transformation itself and an inverse of the transformation function.

In another embodiment, the transformation function module 240 may obtain the transformation function from a user of central computing system 110 or form another computing system. In such embodiments, the user or other computing system may supply a transformation function to the transformation function module 240. Alternatively, the user or other computing system may cause transformation function module 240 to choose, verify, or adjust some transformation templates that include various transformation functions that may be used. Accordingly, it will be appreciated that the transformation function module 240 may generate the transformation function or it may obtain the transformation function from a user or another computing system. For example, suppose that the first computation 280 is associated with a problem that deals with a spatial interpretation, where each dimension is complex, approximately continuous, or otherwise highly variable. Such a first computation 280 suggests a linear transformation function 245. For instance, say X is a set of 3D shapes, and the first computation 280 is to compute the total volume of the shapes in X. Then a transformation function 245 can be chosen from the space of linear transformations.

As mentioned, applying the transformation function 245 to the first computation 280 produces the second computation 290 that is equivalent to the first computation 280. As previously discussed, an equivalent problem or computation is one that, when the transformation function 245 is removed, is substantially the same as the first problem or computation. A simple linear transformation may be used to illustrate this point. For example, suppose that the first computation 280 were a simple equation of 1+1. Further, suppose that the transformation function 245 were a linear transformation of $f(x)=x*100$. When applied to the equation 1+1, the equivalent second computation 290 of 100+100 would be produced. As can readily be seen, the result of 1+1 is 2, and the result of 100+100 is 200. Applying the inverse of the linear transformation to the result 200, would give the second computation 290 a result of 2, which is substantially the same as the result of 2 of the first computation 280. It will be appreciated that, although simple equations and a simple linear transformation were used for ease of illustration, more complex transformations may be used on more complex problems. As previously discussed, the type of the first computation 280 generally dictates what type of transformation function 245 may be used to produce an equivalent second computation 290.

In one illustrative embodiment, the transformation function 245 may be a transformation space that may be divided into multiple transformation function components 245a, 245b, and potentially any number of additional transformation function components 245c as illustrated by ellipses in FIG. 2. In such embodiments, any one of the transformation function components 245a, 245b, 245c may be applied to the first computation 280 to produce the equivalent second computation 290.

In those embodiments where the first computation 280 is divided into multiple first computation components 280a, 280b, 280c, any one of the transformation function components 245a, 245b, 245c may be applied to a particular first computation subset 280a, 280b, 280c to produce the second computation 290. For instance, the transformation function subset 245b may be applied to the first computation subset 280a to produce the equivalent second computation 290. At a later time, the transformation function subset 245b may be applied to the first computation subset 280b to produce the equivalent second computation 290. At still a later time, the transformation function subset 245a may be applied to the first computation subset 280a to produce the equivalent second computation 290. Thus, any one of the transformation function components 245a, 245b, 245c of the transformation function space may be used to produce the equivalent second computation 290.

The central computing system 110 further includes an assignment module 250. The assignment module 250 may randomly assign two of the untrusted computing nodes 130, 140, 150, 160, 170 to perform the first computation 180 and the second computation 290. By randomly selecting or assigning the two untrusted computing nodes, in this case the untrusted computing nodes 130 and 140, the chances of the two untrusted computing nodes colluding with one another or having one computing node steal results from the other computing node are reduced.

In the illustrated embodiment, the untrusted computing node 130 is randomly assigned by the assignment module 250 to perform the first computation 280. The first computation 280, whether the entire computation or a subset of a larger, more complex computation, may be provided to untrusted computing node 130 as illustrated in FIG. 2. The untrusted computing node 130 may then at least partially perform the first computation 280 using the processing resources 135.

The assignment module 250 may randomly assign the untrusted computing node 140 to perform the equivalent second computation 290. The second computation 290 may be provided to the untrusted computing node 140 as illustrated in FIG. 2. The untrusted computing node 140 may then at least partially perform the second computation 290 using the processing resources 145.

As an additional safeguard, the transformation function 245 may be kept secret from the untrusted computing nodes 130 and 140. As will be appreciated, if either of the untrusted computing nodes 130 or 140 knew the identity of the transformation function 245, then it would be much easier for one or both of the untrusted computing nodes 130 or 140 to attempt to guess what the solution to the first computation 280 and the second computation 290 should be. By keeping the transformation function 245 a secret, the chances that invalid results may be returned by the untrusted computing nodes 130 or 140 is lessened.

In those embodiments where the first computation 280 is divided into multiple first computation components 280a, 280b, 280c as previously discussed, the assignment module 250 may randomly select which of the first computation components 280a, 280b, 280c to assign to a randomly selected untrusted computing node, such as the untrusted computing node 130. Likewise, in those embodiments where the transformation function 245 is a transformation space with multiple transformation function components 245a, 245b, 245c, the assignment module 250 or the transformation function module 240 may randomly select which one of the transformation function components 245a, 245b, 245c is to be used to generate the equivalent second computation 290. The random selection of the first computation subset 280a, 280b or 280c and the transformation function subset 245a, 245b or 245c provides additional security against collusion by the untrusted computing nodes 130 or 140, in this example.

A receive module 260 may receive a first result 285 for the first computation 280 from the untrusted computing node 130 and may also receive a second result 295 for the second computation 290 from the untrusted computing node 140, in this example.

As previously discussed, the untrusted computing nodes 130 and 140 (as well as the untrusted computing nodes 150, 160, 170) are untrusted because they are not controlled by the central computing system 110. Thus, the central computing system 110 does not know if the results returned by the untrusted computing nodes 130 and 140 are valid. To provide against faking results by returning invalid results or freeloading by copying work performed by another untrusted computing node, the central computing system 110 includes an analysis module 270. The analysis module 270 may analyze the first result 285 and the second result 295 to verify the work performed by the untrusted computing nodes 130 and 140.

In one illustrative embodiment, the analysis module 270 may analyze the first result 285 and the second result 295 by removing the transformation function 245 from the second result 295. The analysis module 270 may then compare the first result 285 and the second result 295 with each other. As previously described above in relation to the liner transformation example, removing the transformation function 245 from second result 295 causes the second result 295 to be substantially the same as the first result 285 when the first computation 280 and the second computation 290 have been properly performed and valid results have been provided by the untrusted computing nodes 130 and 140. Accordingly, if the first result 285 and the second result 295 match one another, then it is likely that the untrusted computing nodes 130 and 140 have provided valid results. It is very unlikely for both the untrusted nodes 130 and 140 to collude in such a way as to both provide invalid, equivalent results or for one untrusted node to provide fraudulent results that match the results of the other untrusted node.

On the other hand, if the analysis module 270 finds a difference between the first result 285 and the second result 295 after the comparison, then it may be implied that at least one of the untrusted computing nodes 130 and 140, and possibly both the untrusted computing nodes 130 and 140, have provided an invalid result. These results may then be viewed suspiciously by the central computing system 110.

In one illustrative embodiment, the first result 285 and/or the second result 295 may include a series of intermediate results. For example, the first result 285 may include a series of first intermediate results 285a, 285b, and potentially any number of additional intermediate results 285c, as illustrated by ellipses in FIG. 2. Similarly, the second result 295 may include a series of second intermediate results 295a, 295b, and potentially any number of additional intermediate results 295c, as illustrated by ellipses in FIG. 2. In such embodiments, the first computation 280 and/or the second computation 290 may be modified to allow for intermediate results to be determined and returned to the central computing system 110 prior to the full first result 285 and second result 295 being determined and returned to the central computing system 110.

The analysis module 270 may analyze the first intermediate results 285a, 285b, 285c and the second intermediate results 295a, 295b, 295c, by, for example, comparing them to determine if the untrusted computing nodes 130 and 140 have provided invalid results. If the first intermediate results 285a, 285b, 285c match the second intermediate results 295a, 295b, 295c, then it is likely the results are valid. If the first intermediate results 285a, 285b, 285c do not match the second intermediate results 295a, 295b, 295c, then it is likely the results are invalid. Use of intermediate results provides for additional protection against fraud and collusion, as it would be very unlikely for the untrusted computing nodes 130 and 140 to collude in such a way as to both provide equivalent, invalid intermediate results or for one untrusted node to provide fraudulent intermediate results that matched the intermediate results of the other untrusted node.

In one illustrative embodiment, the inverse of the transformation function 245 may be applied to each of the second intermediate results, 295a, 295b, 295c. Such application would cause the second intermediate results 295a, 295b, 295c to be equivalent to the corresponding first intermediate results 285a, 285b, 285c. It is noted that, in such embodiments, the transformation function 245 need not be a single function. For example, the transformation function 245 could be multiple bijections to be applied to the first computation 280 to produce the second computation 290, to the second intermediate results 295a, 295b, 295c and to the second result 295, respectively.

As mentioned, the analysis module 270 analyzes the first result 285 for the first computation 280 and the second result 295 for the second computation 290 to determine if they are likely valid. However, it is possible that the analysis performed by the analysis module 270 may not determine the trustworthiness of an individual untrusted computing node. For example, if the first result 285 from the untrusted computing node 130 does not match the second result 295 from the untrusted computing node 140, it does not necessarily mean that the untrusted computing node 130 has dishonestly provided fraudulent results. It is possible that the untrusted computing node 140 provided the fraudulent results or that the untrusted computing node 130 has made a genuine mistake when performing the first computation 280.

To help determine which of the untrusted computing nodes 130 or 140, in this example, may have provided the fraudulent or invalid results, the first result 285 and the second result 295 are provided to the database 220 and are included in the history 225. As mentioned previously, the history 225 may include the total historical results from earlier computations provided by the untrusted computing node 130 and the untrusted computing node 140.

The analysis module 270 may access the history 225 to determine the trustworthiness of the untrusted computing node 130 and the untrusted computing node 140. If the untrusted computing node 130 has a history of being in pairs of untrusted computing nodes whose results agree, then it can be assumed that the current disagreement is caused by the untrusted computing node 140 or is a genuine mistake. On the other hand, if the untrusted computing node 130 has a history of being in many pairs of untrusted computing nodes whose results disagree, then the untrusted computing node 130 may be viewed with suspicion and its results may be discounted. A similar analysis may be performed on the results provided by the untrusted computing node 140 and indeed any untrusted computing node. Accordingly, the use of the history 225 provides for an additional check to verify if a particular untrusted computing node is to be trusted based on the untrusted computing node's historical performance. As will be appreciated, an untrusted computing node is likely to be trustworthy if the majority of its stored results in the history 225 are valid and is not likely to be trustworthy if the majority of its stored results in the history 225, or even a substantial proportion thereof, are invalid.

In some embodiments, the first computation 280 and/or the second computation 290 may also be augmented with various technologies such as encryption, digital signatures, or obfuscation. These technologies may be included to provide an additional barrier to tampering by the untrusted computing nodes.

It may be possible that the untrusted computing node 130 learns or guesses the transformation function 245 even though the central computing system 110 has kept the transformation function 245 a secret. In such cases, the untrusted computing node 130 may be able to maliciously provide an invalid first result 285 or may be able to more easily copy the second result 295 and pass this result as its own result.

Alternatively, the first computation 280 may be of a type that allows the untrusted computing node 130 to guess a correct answer more than 50% of the time. In such cases, the untrusted computing node 130 may cease to perform the first computation 280 and may simply guess the result every time because of the large chance of being correct.

To help detect such situations, the analysis module 270 may include a probability module 275. The probability module may apply one or more probability functions to the first result 285 and the second result 295 to determine if these results are valid and if the untrusted computing nodes 130, 140, 150, 160, 170 are being trustworthy. Accordingly, determining the probability that the first result 285 and the second result 295 have been properly determined and not just guessed correctly or stolen provides an additional way for the central computing system 110 to verify the trustworthiness of the untrusted computing nodes 130, 140, 150, 160, 170. Examples of some probability functions will now be discussed.

Suppose some large task (such as the first computation 280) requires the computation of f (x) for many x's. Let f: $X \rightarrow Y$. If the probability distribution of f (x), where x is considered a uniformly distributed random variable, is too narrow so that guessing a correct value is plausible, then f is modified to output certain intermediate state s in addition to the result y. Then $f(x)=(s, r)$. Denote the unknown, true result with $y_1=(s, r)$.

Let $\epsilon$ be background information that nodes possess. Denote the probability of a node not performing the work with P(E(n)). IF E(n), then node n is trying to fake the work. In this case, say the node is guessing. Denote the probability of guessing the right answer with P $(y=y_1\epsilon)$.

The work request f (x) is given to some computation node n. Concurrently another work request f (x') is generated. Say $f(x')=(s', r')$. To select x', first find a transformation function g: $X \rightarrow X$ such that $g(s)=s'$ and $g(r)=r'$ if and only if $x'=g(x)$. The work request f(x') is given to another node $n_2$, and the transformation $g \epsilon G$ is held as a secret.

Let P $(n_i (g)|\epsilon)$ be the probability that node $n_i$ learns or guesses the secret transformation g. If g is chosen from a large space, and if that secret is held securely, then P $(n_i(g)|\epsilon)$ will be small.

Both nodes then claim to perform their assigned tasks, and they report the results $y=(s, r)$ and $y_1=(s',r)$. Table 1 below shows the various probabilities of the different outcomes for the nodes that are possible. In other words, how does $y=y_1$ for various circumstances.

TABLE 1

| $n_1$ | $n_2$ | $y = y_1$ | |
|---|---|---|---|
| Performed work | Performed work | TRUE | $P(E(n_1) \wedge E(n_2))$ |
| Performed work | Guessed correctly | TRUE | $P(E(n_1) \wedge y' = y \wedge E(n_2) \backslash \epsilon)$ |
| Performed work | Freeloaded | TRUE | $P(E(n_1) \wedge n_2(g) \backslash \epsilon)$ |
| Guessed correctly | Performed work | TRUE | $P(y = y_1 \wedge E(n_2) \backslash \epsilon)$ |
| Guessed correctly | Guessed correctly | TRUE | $P(y = y_1 \wedge E(n_1) \wedge y_* = y_1 \wedge E(n_2) \backslash \epsilon)$ |
| Guessed correctly | Freeloaded | TRUE | $P(y = y_1 \wedge E(n_1) \wedge n_2(g) \backslash \epsilon)$ |
| Guessed incorrectly | Guessed the same incorrect value | FALSE | $P(y = y_1 \wedge E(n_1) \wedge y' = y_1 \wedge E(n_2) \backslash \epsilon)$ |
| Guessed incorrectly | Freeloaded | FALSE | $P(y = y_1 \wedge E(n_1) \wedge n_2(g) \backslash \epsilon)$ |

Therefore, the probability that y does not equal $y_1$ is $$P((y \neq \hat{y} \wedge \neg E(n_1) \wedge y = y' \wedge \neg E(n_2)) \vee (y \neq \hat{y} \wedge \neg E(n_1) \wedge n_2(g) | \xi)),$$

Figure 3:
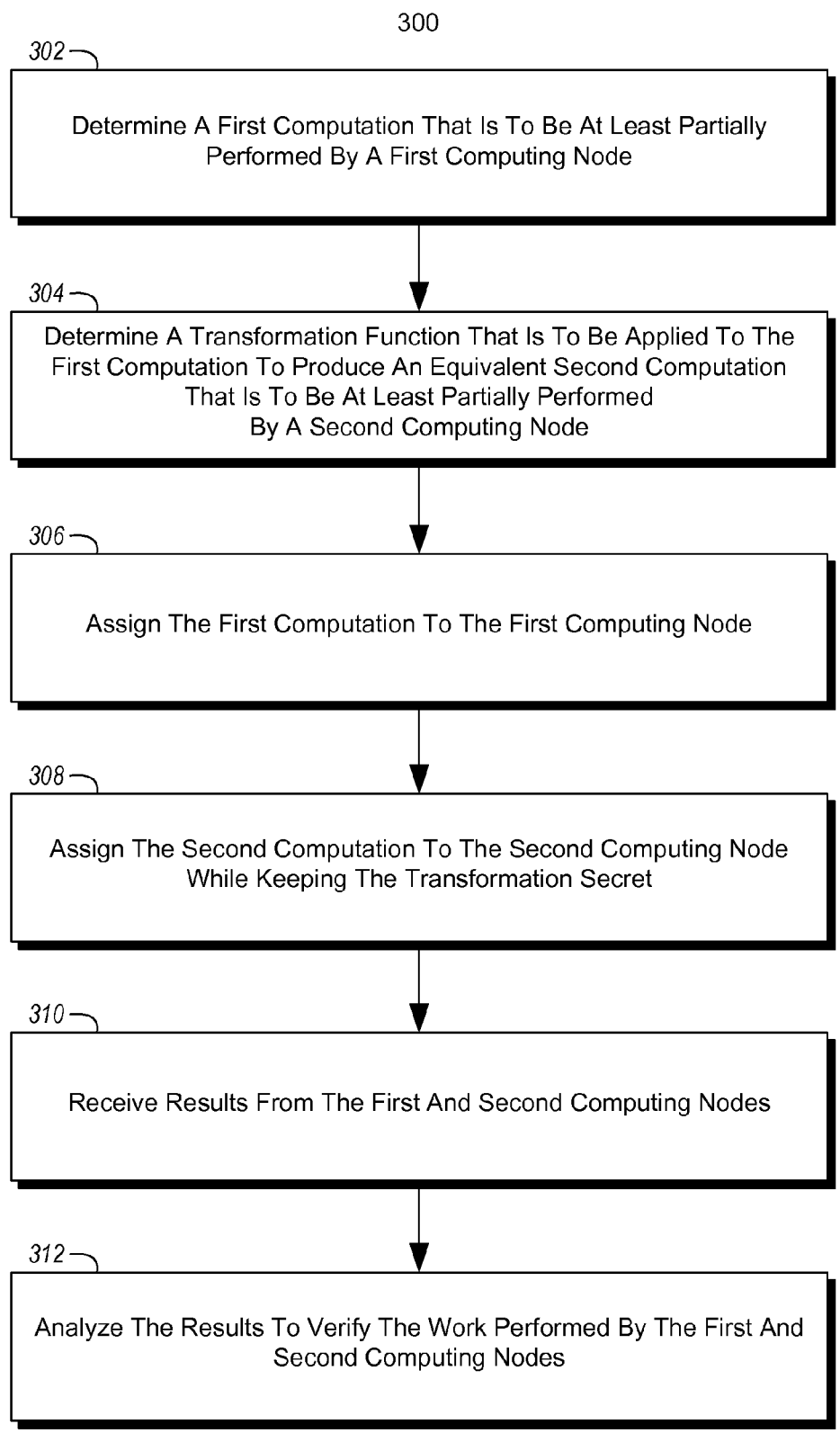
FIG. 3 is a flow diagram of an illustrative embodiment of a method for verifying the work performed by untrusted computing nodes.

FIG. 3 is a flow diagram of an illustrative embodiment of a method 300 for verifying the work performed by untrusted computing nodes. In the illustrated embodiment, the method 300, and other methods and processes described herein, set forth various functional blocks or actions that may be described as processing steps, functional operations, events and/or acts, etc., which may be performed by hardware, software, and/or firmware. The method 300 includes one or more operations as illustrated by blocks 302, 304, 306, 308, 310, and/or 312. In block 302, a first computation that is to be at least partially performed by a first untrusted computing node is determined. For example, in one illustrative embodiment, the computation generation module 230 may generate the first computation 280 that is to be at least partially performed by a first untrusted computing node such as the untrusted computing node 130. In some embodiments, the first computation 280 may be divided into the first computation components 280a, 280b, 280c.

In block 304, a transformation function that is to be applied to the first computation to produce an equivalent second computation that is to be at least partially performed by a second untrusted computing node is determined. For example, in one illustrative embodiment, the transformation function module 240 may generate the transformation function 245 based on the type of the first computation 280. In another illustrative embodiment, the transformation function module may obtain the transformation function from a user of computing system 110 or from another computing system. The transformation function 245 may be applied to the first computation 280 to produce the second computation 290 that may be performed by a second untrusted computing node such as the untrusted computing node 140. In some embodiments, the transformation function 245 may be a transformation space that includes the multiple transformation function components 245a, 245b, 245c.

In block 306, the first computation is assigned to the first untrusted computing node and, in block 308, the second computation is assigned to the second untrusted computing node. The assignment of the first computation and the second computation to the first untrusted computing node and the second untrusted computing node, respectively, are made while keeping the transformation function secret from the first and second untrusted computing nodes. For example, in one illustrative embodiment, the assignment module 250 may assign the first computation 280 to the untrusted computing node 130 and may assign the second computation 290 to the untrusted computing node 140.

In block 310, a first result for the first computation is received from the first untrusted computing node and a second result for the second computation is received from the second untrusted computing node. For example, in one illustrative embodiment, the receive module 260 may receive the first result 285 from the untrusted computing node 130 and may receive the second result 295 from the untrusted computing node 140. In some embodiments, the first result 285 may include the first intermediate results 285a, 285b, 285c. The second result 295 may include the second intermediate results 295a, 295b, 295c.

In block 312, the first and second results are analyzed to verify the work performed by the untrusted computing nodes. In one illustrative embodiment, the analysis module 270 may analyze the first result 285 and the second result 295 to verify the work performed by the untrusted computing node 130 and the untrusted computing node 140. In this way, the trustworthiness of the untrusted computing node 130 and the untrusted computing node 140 may be determined.

In some embodiments, the analysis module 270 removes the transformation function 245 from the second result 295 and then compares the second result 295 with the first result 285. If the results are substantially the same, then it is likely that the untrusted computing node 130 and the untrusted computing node 140 provided valid results. However, if the results are different, then it is likely that one or both of the untrusted computing node 130 and the untrusted computing node 140 have provided invalid results.

A historical database may also be accessed so that the historical performance of the untrusted computing node 130 and the untrusted computing node 140 may be determined as previously described. In addition, one or more probability functions may be applied to the results to help determine the trustworthiness of the untrusted computing node 130 and the untrusted computing node 140.

The method 300 provides a mechanism for the central computing system 110 to determine if the untrusted computing node 130 and the untrusted computing node 140 have engaged in fraud, such as guessing a result or providing invalid results. Further, the method 300 allows the central computing system 110 to determine collusion between the untrusted computing node 130 and the untrusted computing node 140 to provide invalid results.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
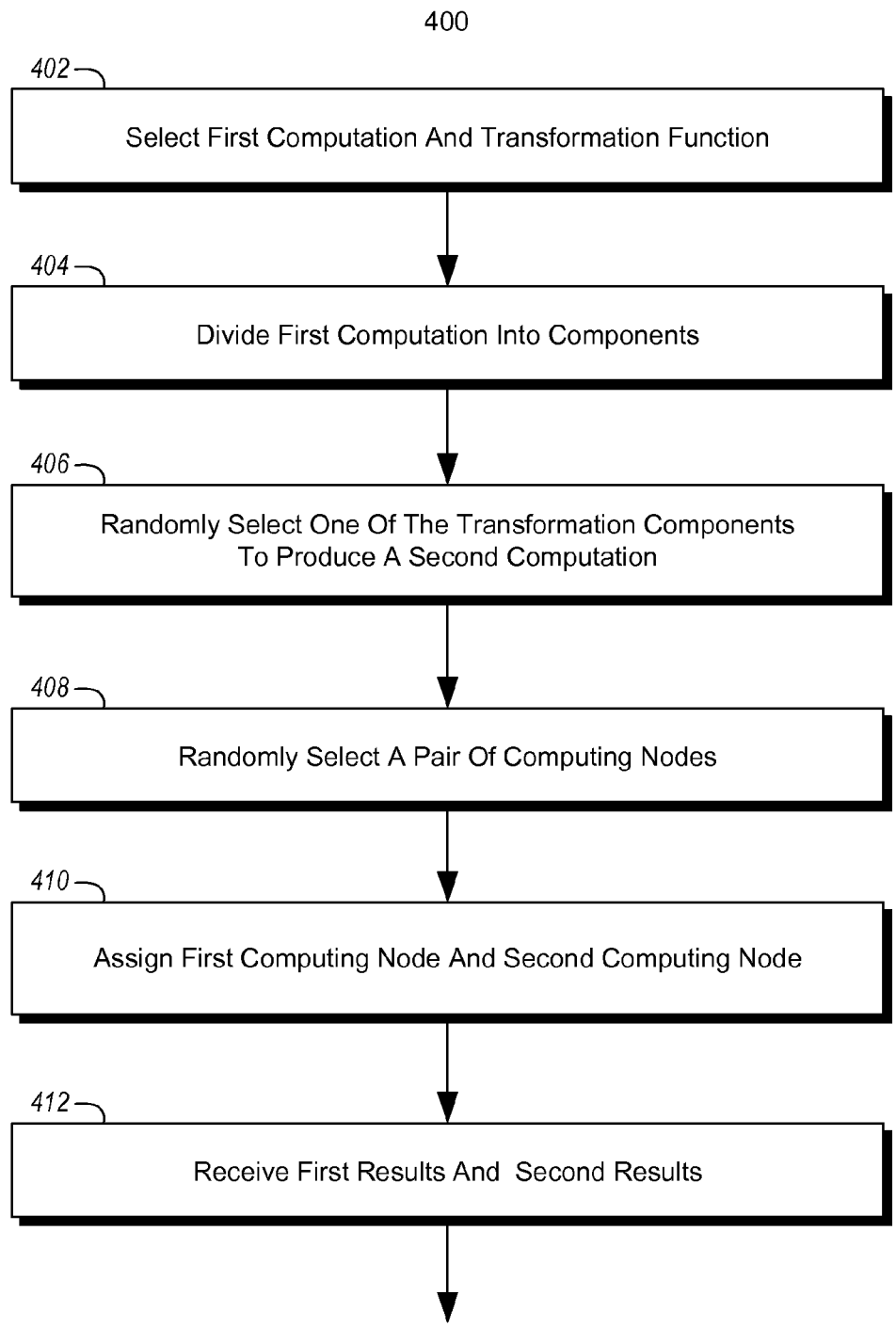
FIG. 4 is a flow diagram of an alternative embodiment of a method for verifying the work performed by untrusted computing nodes.
Figure 4:
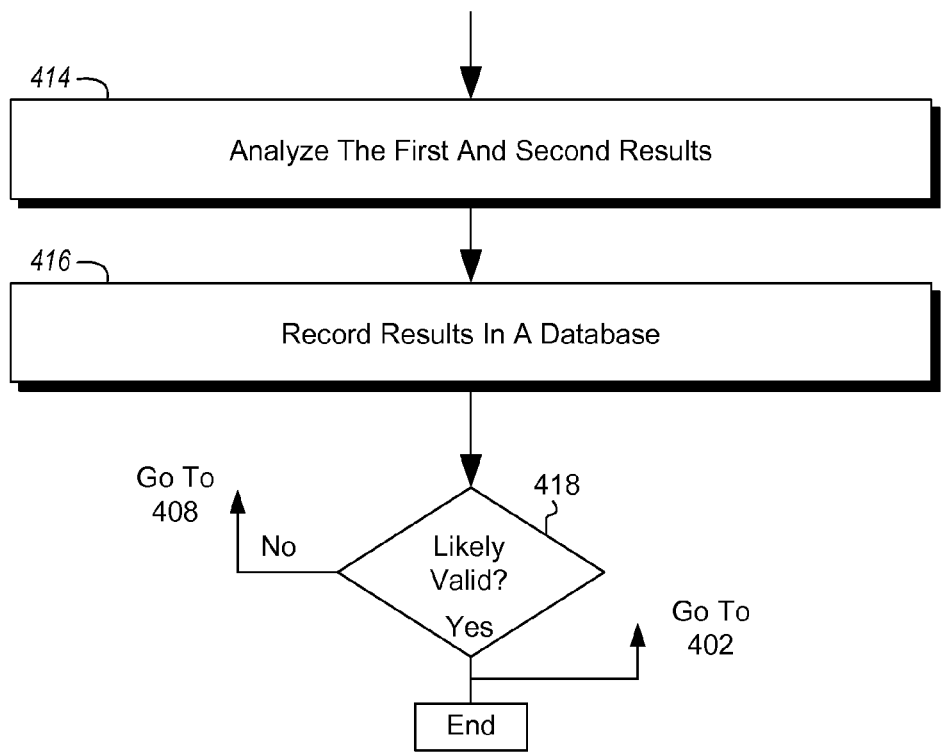

FIG. 4 is a flow diagram of an illustrative embodiment of an alternative method 400 for verifying the work performed by untrusted computing nodes. The method 400 includes one or more operations as illustrated by blocks 402, 404, 406, 408, 410, 412, 414, 416 and/or 418. In block 402, a first computation and a transformation space that includes transformation function components are selected. For example, the first computation 280 may be selected by the computation generation module 230. The transformation function 245 including the transformation function components 245a, 245b, 245c may be selected by the transformation function module 240 based on the first computation 280.

In block 404, the first computation is divided into components. For example, the first computation 280 may be divided into first computation components 280a, 280b, 280c by the computation generation module 230.

In block 406 one of the transformation function components is randomly selected to apply to one of the first computation components. This in turn produces a second computation. For example, the first transformation function subset 245a may be randomly selected and applied to a randomly selected first computation subset 280a. This may produce the second computation 290.

In block 408, a pair of untrusted computing nodes is randomly selected to perform the first computation subset and the second computation. For example, the assignment module 250 may randomly select the untrusted computing node 130 to perform the first computation subset 280a and the untrusted computing node 140 to perform the second computation 290.

In block 410, the first computation subset is assigned to the first untrusted computing node and the second computation is assigned to the second untrusted computing node while keeping the randomly selected transformation function subset secret. For example, the assignment module 250 may assign the first computation subset 280a to the untrusted computing node 130 and may assign the second computation 290 to the untrusted computing node 140. The transformation function subset 245a is kept secret from the untrusted computing nodes.

In block 412, a first result is received from the first untrusted computing node and a second result is received from the second untrusted computing node. For example, the receive module 260 may receive the first result 285 from the untrusted computing node 130 and may receive the second result 295 from the untrusted computing node 140.

In block 414, the first and second results are analyzed. For example, the analysis module 270 may analyze the first result 285 and the second result 295 in any of the ways previously described.

In block 416, the first and second results are recorded in a database. For example, the first result 285 and the second result 295 may be recorded in the database 220. The results may be added to the history 225 and may be used to help determine the trustworthiness of the untrusted computing nodes as previously described.

In decision block 418, it is determined if the results were valid. This determination may be made using the comparison of the results, the historical analysis, and applying the probability functions as previously described.

If the results are determined to be likely valid (Yes in decision block 418), the method may end if there are no other computations to perform. Alternatively, if there are other computations to perform, the method returns to the block 402 and the method is repeated.

If the results are determined to not be likely valid (No in decision block 418), the method may return to the block 406, where two new untrusted computing nodes that are different from the first and second untrusted computing nodes may randomly be selected. The remaining blocks of method 400 may then be performed to determine if the newly selected untrusted computing nodes provide valid results. For example, after returning to the block 406, the assignment module 250 may randomly select the untrusted computing node 150 to perform the first computation subset 280a and may randomly select the untrusted computing node 160 to perform the second computation 290. The remaining blocks of method 400 may then be performed.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 5:
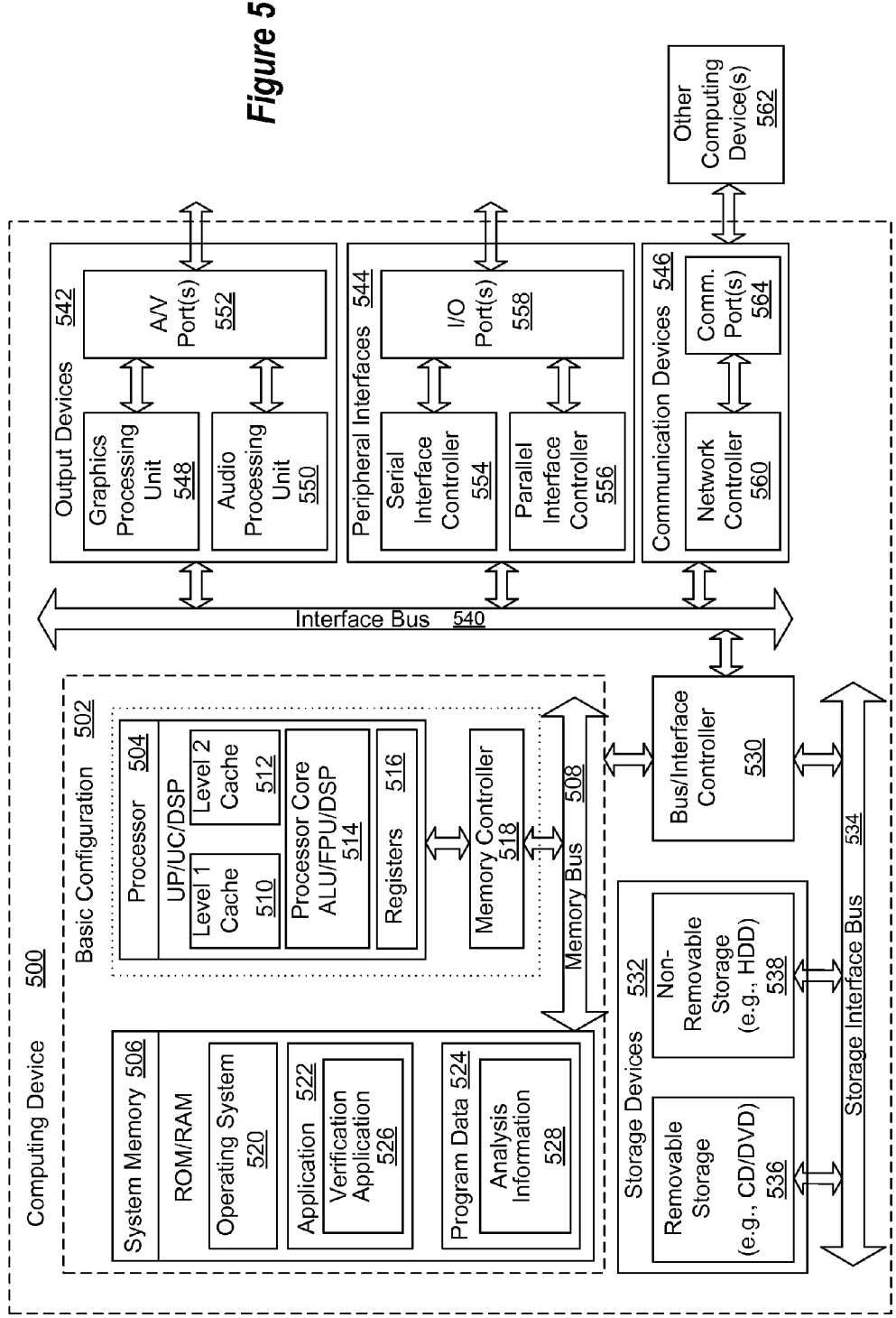
FIG. 5 shows an example computing device that is for verifying the work performed by untrusted computing nodes in accordance with the present disclosure.

FIG. 5 shows an example computing device 500 that is arranged for verifying work performed by untrusted computing nodes in a distributed computing system in accordance with the present disclosure. In a very basic configuration 502, computing device 500 generally includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a verification application 526 that is arranged to perform the functions as described herein including those described with respect to method 300 of FIG. 3 and method 400 of FIG. 4. Program Data 524 may include analysis information 528 that may be useful for analyzing the results provided by the untrusted computing nodes. In some embodiments, application 522 may be arranged to operate with program data 524 on operating system 520 such that the work performed by untrusted computing nodes can be verified as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for a computing system to verify work performed by two or more untrusted computing nodes, the method comprising:
   determining, at the computing system, a first computation;
   applying, at the computing system by one or more processors, a transformation function to the first computation to produce a second computation that is different from the first computation;
   assigning, at the computing system, the first computation to be performed by a first untrusted computing node;
   assigning, at the computing system, the second computation to be performed by a second untrusted computing node while keeping the transformation function secret from the first untrusted computing node and the second untrusted computing node;
   receiving, at the computing system, a first result for the first computation determined by the first untrusted computing node and a second result for the second computation determined by the second untrusted computing node;
   analyzing, at the computing system by one of the one or more processors, the first and second results to verify the work performed by the first and second untrusted computing nodes;
   storing, at the computing system, the first result and the second result in a storage unit that includes results from past computations performed by the first and second untrusted computing nodes; and
   determining, at the computing system by one of the one or more processors, whether the first and second untrusted computing nodes are deemed to be trustworthy based on total results for each of the first and second untrusted computing nodes stored in the storage unit, wherein the first and second untrusted computing nodes are deemed to be trustworthy in response to a majority of the total results for each of the first and second untrusted computing nodes being valid, and wherein the first and second untrusted computing nodes are deemed to not likely be trustworthy in response to the majority of the total results for each of the first and second untrusted computing nodes being invalid.

2. The method of claim 1, wherein the analyzing, at the computing system, the first and second results to verify the work performed by the first and second untrusted computing nodes comprises:
   removing the transformation function from the second result by applying an inverse of the transformation function to the second result; and
   comparing the first result with the second result after the transformation is removed,
   wherein the first result being substantially the same as the second result after the transformation is removed implies the first and second computations have each been correctly performed and valid results have been provided by the first or second untrusted computing nodes, and
   the first result not being substantially the same as the second result after the transformation is removed implies that either the first untrusted computing node or the second untrusted computing node, or both the first and second untrusted nodes, have provided an invalid result.

3. The method of claim 1, wherein the first computation is one of a plurality of computation components that form a third computation.

4. The method of claim 1, further comprising:
   determining the transformation function applied to the first computation, the transformation function including a plurality of transformation function components;
   selecting a first transformation function component of the plurality of transformation function components; and
   applying the selected first transformation function component to the first computation to produce the second computation.

5. The method of claim 1, wherein:
   each of the first and second untrusted computing nodes is one of a plurality of untrusted computing nodes,
   the assigning, at the computing system, the first computation to be performed by the first untrusted computing node comprises randomly selecting, at the computing system, the first untrusted computing node from the plurality of untrusted computing nodes, and
   the assigning, at the computing system, the second computation to be performed by the second untrusted computing node comprises randomly selecting, at the computing system, the second untrusted computing node from the plurality of untrusted computing nodes.

6. The method of claim 1, wherein the analyzing, at the computing system, the first and second results to verify the work performed by the first and second untrusted computing nodes comprises applying one or more probability functions to the first and second results to determine if the first and second results are valid.

7. The method of claim 6, further comprising, after determining that the first and second results are invalid, randomly selecting a third untrusted computing node and a fourth untrusted computing node to perform the first computation and the second computation, respectively.

8. A non-transitory computer-readable media having stored thereon computer-executable instructions that, in response to execution by a processor, cause a computing system to:
   determine a first computation;
   apply a transformation function to the first computation to produce a second computation that is different from the first computation;
   assign the first computation to be performed by a first untrusted computing node;
   assign the second computation to be performed by a second untrusted computing node while keeping the transformation function secret from the first untrusted computing node and the second untrusted computing node;
   identify a first result for the first computation determined by the first untrusted computing node;
   identify a second result for the second computation determined by the second untrusted computing node;
   analyze the first and second results to verify the work performed by the first and second untrusted computing nodes;
   store the first result and the second result in a storage unit that includes results from past computations performed by the first and second untrusted computing nodes; and
   determine whether the first and the second untrusted computing nodes are deemed to be trustworthy based on total results for each of the first and second untrusted computing nodes stored in the storage unit, wherein the first and second untrusted computing nodes are deemed to be trustworthy in response to a majority of the total results for each of the first and second untrusted computing nodes being valid,
   and wherein the first and second untrusted computing nodes are deemed to not likely be trustworthy in response to the majority of the total results for each of the first and second untrusted computing nodes being invalid.

9. The non-transitory computer-readable media of claim 8, wherein to analyze the first and second results to verify the work performed by the first and second untrusted computing nodes, the computer-executable instructions are executable by the processor to cause the computing system to:
remove the transformation function from the second result by applying an inverse of the transformation function to the second result; and
compare the first result with the second result after the transformation is removed,
wherein the first result being substantially the same as the second result after the transformation is removed implies the first and second computations have each been correctly performed and valid results have been provided by the first or second untrusted computing nodes, and
the first result not being substantially the same as the second result after the transformation is removed implies that either the first untrusted computing node or the second untrusted computing node, or both the first and second untrusted nodes, have provided an invalid result.

10. The non-transitory computer-readable media of claim 8, wherein the first computation is one of a plurality of computation components that form a third computation.

11. The non-transitory computer-readable media of claim 10, wherein the computer-executable instructions, in response to execution by the processor, further cause the computing system to:
determine the transformation function applied to the first computation, the transformation function including a plurality of transformation function components;
select a first transformation function component of the plurality of transformation function components; and
apply the selected first transformation function component to the first computation to produce the second computation.

12. The non-transitory computer-readable media of claim 8, wherein:
each of the first and second untrusted computing nodes is one of a plurality of untrusted computing nodes,
assignment of the first computation to be performed by the first untrusted computing node comprises random selection, at the computing system, of the first untrusted computing node from the plurality of untrusted computing nodes, and
assignment of the second computation to the second untrusted computing node comprises random selection, at the computing system, of the second untrusted computing node from the plurality of untrusted computing nodes.

13. The non-transitory computer-readable media of claim 8, wherein to analyze the first and second results to verify the work performed by the first and second untrusted computing nodes, the computer-executable instructions are executable by the processor to cause the computing system to apply one or more probability functions to the first and second results to determine if the first and second results are valid.

14. The non-transitory computer-readable media of claim 13, wherein, after the determination that the first and second results are not valid, the computer-executable instructions, in response to execution by the processor, further cause the computing system to randomly select a third untrusted computing node and a fourth untrusted computing node to perform the first computation and the second computation, respectively.

15. A system comprising:
a computer processor;
a first module operatively coupled to the computer processor and configured to generate a first computation;
a second module operatively coupled to the computer processor and configured to generate a transformation function configured to be applied to the first computation to produce a second computation that is different from the first computation;
a third module operatively coupled to the computer processor and configured to assign the first computation to be performed by a first untrusted node and configured to assign the second computation to be performed by a second untrusted node while the transformation function is kept secret from the first and second untrusted nodes;
a fourth module operatively coupled to the computer processor and configured to receive a first result for the first computation determined by the first untrusted node and a second result for the second computation determined by the second untrusted node;
a fifth module operatively coupled to the computer processor and configured to analyze the first and second results to verify the work performed by the first and second untrusted nodes; and
a storage unit that includes a history of validity of results provided by the first and second untrusted nodes, wherein the fifth module is further configured to use the history to determine trustworthiness of the first and second untrusted nodes based on total results for each of the first and second untrusted computing nodes stored in the storage unit, wherein the first and second untrusted computing nodes are deemed to be trustworthy in response to a majority of the total results for each of the first and second untrusted computing nodes being valid, and wherein the first and second untrusted computing nodes are deemed to not likely be trustworthy in response to the majority of the total results for each of the first and second untrusted computing nodes being invalid.

16. The system of claim 15, wherein:
the first result includes a series of first intermediate results;
the second result includes a series of second intermediate results; and
the fifth module is further configured to compare the first intermediate results with the second intermediate results to determine if the first untrusted node or the second untrusted node has provided invalid results.

17. The system of claim 16, wherein the fifth module is further configured to apply an inverse of the transformation function to the second intermediate results and then compare the first intermediate results with the second intermediate results.

* * * * *

UNITED STATES PATENT AND TRADEMARK OFFICE
CERTIFICATE OF CORRECTION

PATENT NO. : 8,881,275 B2
APPLICATION NO. : 14/084413
DATED : November 4, 2014
INVENTOR(S) : Stephens, Jr.

It is certified that error appears in the above-identified patent and that said Letters Patent is hereby corrected as shown below:

On the Title Page, in item (56), under "OTHER PUBLICATIONS", in Column 2, Line 1, delete "et al "MapReduce: Simiplified" and insert -- et al. "MapReduce: Simplified --, therefor.

On Title Page 2, in item (56), under "OTHER PUBLICATIONS", in Column 1, Line 1, delete "Fuondation" and insert -- Foundation --, therefor.

On Title Page 2, in item (56), under "OTHER PUBLICATIONS", in Column 2, Line 4, delete "Wikepedia" and insert -- Wikipedia --, therefor.

On Title Page 2, in item (56), under "OTHER PUBLICATIONS", in Column 2, Line 7, delete "et al" and insert -- et al. --, therefor.

On Title Page 2, in item (56), under "OTHER PUBLICATIONS", in Column 2, Line 24, delete "et al" and insert -- et al. --, therefor.

On Title Page 2, in item (56), under "OTHER PUBLICATIONS", in Column 2, Line 28, delete "Formalizatins"." and insert -- Formalizations". --, therefor.

In the Drawings

In Fig. 5, Sheet 6 of 6, delete "UP/UC/DSP" and insert -- $\mu P/\mu C/DSP$ --, therefor.

In the Specification

In Column 1, Line 7, delete "continuation" and insert -- continuation under 35 U.S.C. § 120 --, therefor.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,881,275 B2

In Column 1, Line 8, delete "stage" and insert -- stage filing under 35 U.S.C. § 371 --, therefor.

In Column 1, Line 10, delete "Jul. 21, 2010." and insert -- Jul. 21, 2010, now Pat. No. 8,661,537. --, therefor.

In Column 10, Line 49, delete "IF" and insert -- If --, therefor.

In Column 11, Line 17, after equation, delete "," and insert -- . --, therefor.

In Column 15, Line 4, delete "and or" and insert -- and/or --, therefor.